United States Patent [19]

Heyck

[11] 3,886,473
[45] May 27, 1975

[54] CAPACITIVE PRESSURE AND DISPLACEMENT TRANSDUCERS

[76] Inventor: Hans D. Heyck, 38 Sunnyview Dr., Phoenix, Md. 21131

[22] Filed: June 13, 1974

[21] Appl. No.: 478,975

[52] U.S. Cl. ................... 331/42; 73/387; 73/398 C; 317/246; 317/249 T; 324/61 QS; 331/65; 331/117 R; 331/177 R
[51] Int. Cl. ....... G01l 9/12; H01g 5/14; H03b 21/00
[58] Field of Search ............. 331/65, 37, 42, 117 R, 331/177 R; 324/61 R, 61 QS; 317/249 T, 246; 73/386, 387, 398 C

[56] References Cited
UNITED STATES PATENTS

| | | | |
|---|---|---|---|
| 3,308,357 | 3/1967 | Youngblood | 317/246 |
| 3,421,106 | 1/1969 | Garber et al. | 331/65 X |
| 3,595,084 | 7/1971 | Bailey et al. | 73/398 C |
| 3,750,474 | 8/1973 | Pollack | 73/386 |
| 3,756,081 | 9/1973 | Young | 331/65 X |

*Primary Examiner*—Siegfried H. Grimm

[57] ABSTRACT

A capacitive transducer for converting a small displacement of a mechanical input member into an electrical signal directly proportional to the quantity being measured, even if the transfer-function between input quantity and output signal is non-linear, by use of a cylinder-and-piston capacitor with suitably shaped electrodes, and a plurality of adjustable verniercapacitors. When used in an alternating-current bridge-circuit, an a.c. voltage proportional to said mechanical input quantity results. (Claim 1).

To provide a digital output signal directly proportional to a mechanical input quantity being measured, a fixed high-frequency oscillator with an attached binary counter is combined with a second, substantially identical oscillator-and-counter circuit whose frequency is varied by said capacitor assembly. A third counter generates said digital output signal by a count proportional to the frequency difference of said two oscillators, thus substantially compensating for temperature-, supply-voltage-, and ageing drifts which affect both oscillators equally. (Claim 2).

The polarity of bi-directional displacements is determined by a digital priority detection circuit which generates a NEGATIVE INPUT bit whenever a negative input displacement occurs. (Claim 3).

3 Claims, 8 Drawing Figures

PATENTED MAY 27 1975 SHEET 1 3,886,473

CAPACITIVE PRESSURE AND DISPLACEMENT TRANSDUCERS

Representative embodiments of my invention are herein presented, but it will, of course, be appreciated that the invention is susceptible of incorporation in still other forms coming equally within the scope of the appended claims.

With the increasing use of electronic telemetering, data logging, industrial process control, and air traffic control, precise transducers are required for measurement of displacement, pressure, liquid level, flow, weight, and other mechanical quantities, with output signals directly proportional to the quantities being measured. These transducers must be simple, reliable, and moderate in cost. In many cases (for example altitude, airspeed, and flow measurement), the mechanical input displacements are not linearly related to the primary quantities being measured.

Among the many pickoff devices which have emerged, capacitive types have enjoyed a certain popularity because they are relatively simple, can be constructed without sliding contacts, and are relatively unaffected by ambient temperature changes. Applications were, however, primarily in air-dielectric parallel-plate types in which the plate spacing was varied by the mechanical input quantity being measured. Generally, the capacitance and capacitance-variation values were rather small, and the transfer function highly nonlinear (hyperbolic) because the capacitance varies with the inverse of the spacing.

My invention overcomes these limitations of capacitive transducer pickoffs: A substantially linear cylinder-and-piston capacitor whose transfer function can be shaped to match the characteristics of the quantity being measured, combined with a plurality of vernier-capacitors for multi-point fine-trimming of the transducer calibration.

IN THE ACCOMPANYING DRAWINGS

In FIG. 5a a hinged arm serves as transfer link, while in FIG. 5b a part of a direct-acting mechanical input member is indicated which is supported elsewhere.

Figure 1:
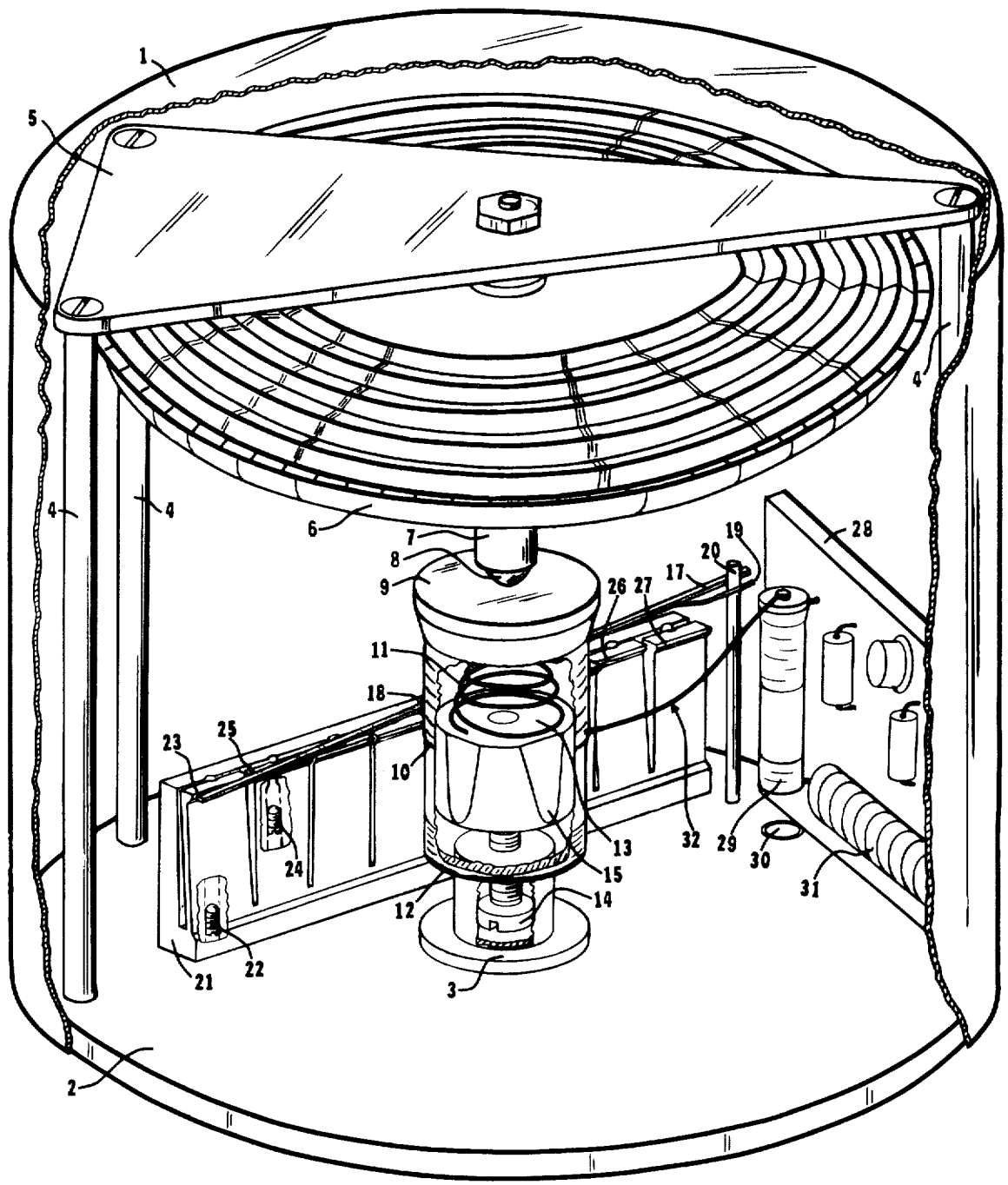
FIG. 1 is a schematic perspective view of a transducer with a straight-line arrangement of vernier capacitors.

The details of my invention can best be understood by reference to the following drawings:

FIG. 1 illustrates the basic arrangement in a schematic perspective view in which the central variable capacitor assembly has been enlarged to approximately double-scale for better clarity, and the electronic component-board assembly has been reduced to approximately half-scale. In a housing assembly 1 which is shown partially cut away, a rigid base-plate 2 carries near its center an upright cylinder-and-piston capacitor 3 & 9. A plurality of columns 4 support, parallel to said base-plate 2, a support-plate 5 on which the mechanical input member 6 is mounted. An evacuated aneroid barometer/altimeter capsule is shown in this illustration, but any other device producing displacements in the 1 mm to 10 mm range can be installed, such as differential pressure capsules, the pivoted drag-paddles of flow-sensors, the balance-arms of weighing-scales, or other micrometer devices.

Housing 1 may be fabricated from any rigid material offering mechanical protection, but metals are preferable because they also provide electromagnetic shielding. In pressure transducer applications, the housing must be sealed gas-tight to the base plate with an O-ring, a flat gasket and a plurality of machine-screws, or by joining with a low-temperature solder.

For greatest calibration stability, the support columns 4 are fabricated from a material whose thermal expansion characteristics match those of the other transducer components, thus minimizing errors caused by changes of transducer temperature. If the mechanical input member has a very low calibration shift with temperature variations, such as pressure capsules made from nickel-chrome alloys with nearly constant elastic modulus, the support columns are preferably made from iron-nickel-cobalt alloys with thermal expansion coefficients below 2 ppm/°C. Still lower expansion coefficients could be obtained with columns of fused quartz. If, on the other hand, the transducer does not have to operate under temperature extremes, or if only moderate accuracy is required, the housing wall itself (being made of iron, brass, aluminum, or other common metal) can serve as the structural spacer. In this case, the housing end-surface, which must be rigid, may carry the mechanical input member, and the columns may be eliminated.

The heart of my invention is the capacitor assembly which is shown mounted on base-plate 2, and which consists of four major parts: a stationary piston-assembly 3 & 13; a cylinder-assembly 9 & 10 which is free to glide axially on said piston-assembly; a slanted metal bar 17 attached to said cylinder-assembly at point 18; a vernier capacitor stator assembly 21. The significance of these four major parts is as follows:

The cylinder-and-piston capacitor assembly is similar to the glass-piston-trimmers used in precision radio and r.f. test equipment, but differs from these in the cylinder not being attached to the base-and-piston assembly. The inside surface of the cylinder (which may consist of glass, quartz, or ceramic dielectric) fits very closely but with minimal friction over said metallic piston and is free to glide on it axially. Except for fringing effects when the piston is fully withdrawn, or fully inserted (when the end-plate of the piston approaches the end-plate of the cylinder and adds capacitance), the relationship between displacement and capacitance is substantially linear, and gradients between 0.25 pF/mm and 3.0 pF/mm are typically obtained.

Several factors may make it necessary to modify the transfer function of the basic cylinder-and-piston capacitor:

a. Small nonlinearities in the capacitor due to manufacturing tolerances, such as variations in the dielectric wall thickness, non-perpendicularity of cylinder and piston edges, and fringing effects at extreme displacements;

b. In an a.c. bridge circuit, the nonlinear relationship between capacitance and bridge output voltage;

c. In an r.f. oscillator circuit, the square-root relationship between capacitance change and frequency change, as expressed in the Thompson resonance equation:

$$f = 1/2\pi \sqrt{L \times C}$$

d. Nonlinearities in the mechanical input members, as found in pressure and vacuum capsules; tangential errors in pivoted arms;

e. Nonlinearity between the quantity being measured and the quantity causing the mechanical displacement, such as pressure/altitude, pressure/airspeed, flow/drag.

In my invention, this is accomplished by shaping the capacitance vs. displacement curve of the capacitor through localized increases of the spacing between cylinder and piston surfaces. On cylinders whose active electrodes are accessible on the outside, shaping can be achieved by grinding or etching away parts of the metal surface. This has the advantage that it can be performed in situ, during calibration, and while the resulting effect on the calibration can be observed. Shaping of the piston surface instead may be more convenient, but it can only be done before final assembly, and care must be taken to remove rough edges which would cause friction. Also, the removal of material from the piston surface should be distributed into three or four approximately equally spaced areas in order to maintain firm support for the cylinder. Removal of metal to a depth of 0.1 mm (0.004 in.) by grinding or etching is generally sufficient, because it creates an added air-space with a dielectric constant of aproximately 1.000 which is much lower than that of the solid dielectric in the cylinder-wall.

Returning to FIG. 1, on the piston 13, two of the three shaping areas 15 are visible. (Cylinder 9, 10, 12 and base 3 are shown partially cut away). A threaded member 14 whose head is accessible from the other side of base plate 2 permits external adjustment of the starting capacitance, by controlling the insertion depth into cylinder 9, 10, 12. A flexible conductor 32 is attached to said cylinder and connects it to circuit board 28.

Mechanical connection of capacitor-cylinder 9 to mechanical input member 6 is accomplished by three means:

a. Electrical insulation of capacitor-cylinder 9 & 10, by placing a hard, non-conducting tip 8 on the push-rod 7 of mechanical input member 6; as an alternate, an insulating disc could be affixed to the top surface 9 of said capacitor-cylinder, and push-rod tip 8 could be a stainless steel ball.

b. Lateral motion freedom of said capacitor-cylinder from said mechanical input member; this is accomplished by placing a flat, polished surface perpendicular to the axis onto the end of said capacitor-cylinder (item 9), and shaping the push-rod tip 8 convex. Hence, relatively large lateral offsets can exist without causing friction between cylinder 9, 10, 12 and piston 13. This arrangement could, of course, be reversed by making cylinder-end 9 convex, and push-rod-end 7 flat, and further variations are shown in FIG. 5.

c. Keeping capacitor-cylinder 9, 10, 12 in intimate contact with mechanical input member 6, which is accomplished by one of four means: (1) A spring pushing said capacitor-cylinder away from base-plate 2, by installing a compression-spring 11 inside said cylinder-and-piston capacitor, with an insulating member at one end to prevent shorting said capacitor, or by mounting a spring (or springs) between the skirt 12 of said capacitor-cylinder and base-plate 2 (the latter alternative not illustrated). (2) An extension spring or loop of elastic material (O-ring) pulling the top-surface 9 of said capacitor-cylinder toward the mechanical input member 6, with an insulating member inserted if said extension spring is metallic. This is illustrated in FIG. 5. (3) A magnet mounted at the skirt 12 of said capacitor-cylinder, and an identically polarized magnet mounted at base-plate 2 and repelling each other (not shown). (4) Two magnets or one magnet and a soft-iron member attracting each other, one ea. mounted at surface 9 and push-rod 7.

This completes the description of the cylinder-and-piston capacitor, and a discussion of the vernier capacitors follows. Among the various possible configurations, the circular type (shown in FIG. 3) and the linear type are most convenient to produce. The latter, shown in FIG. 1, consists of an armature-bar 17 and a stator assembly 21.

Armature-bar 17 is a thin straight metal bar, with a narrow flat edge facing toward stator assembly 21, and attached to the capacitor-cylinder mantle 10 at location 18, by soldering, brazing or welding. Said armature-bar is slanted in the vertical axis to an angle that places is ends at a height difference equalling the full-scale stroke of the transducer. A smooth insulating rod 20, mounted vertically in base-plate 2, serves as a guide and restrains armature-bar 17 rotationally. Attached to said armature-bar is a spring-wire 19 which forms the second branch of an elastic fork capable of gliding along said rod 20 with minimal friction.

Vernier capacitor stator 21 is a sloted metal bar mounted upright on base-plate 2. Deep vertical slots divide said metal bar into a plurality of vertical tongues whose top edges form a plurality of grounded capacitor-stators facing the edge of armature-bar 17. When input member 6 is in its fully withdrawn position (as shown in FIG. 1), the edge of slanted armature-bar 17 faces the top-edge 23 of the left-most metal tongue, thus adding a small amount of capacitance to that of the cylinder-and-piston capacitor.

As mechanical input member 6 pushes capacitor-cylinder 9 & 10 downward, armature-bar 17 leaves stator-edge 23 and moves in front of stator-edge 25, and so on, until coming to face stator-edge 27 on the extreme end. The result is a plurality of localized capacitors, each of which is effective over a portion of the transducer span, and overlapping with the adjacent capacitor stators.

Figure 4A:
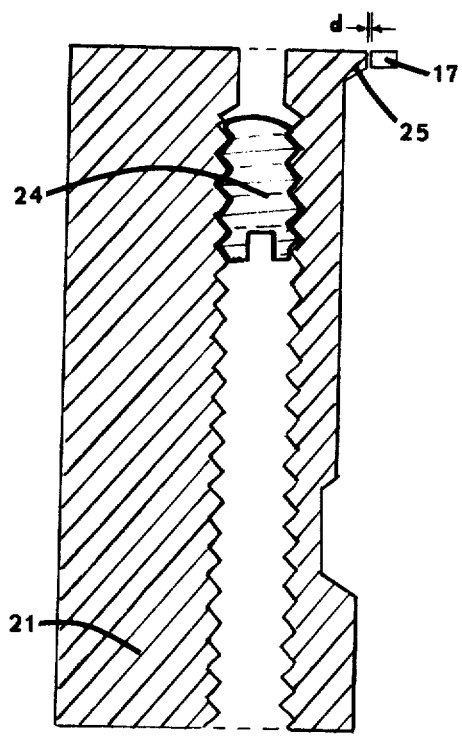
FIG. 4a is a cross-section of a vernier-capacitor assembly at maximum capacitance setting.
Figure 4B:
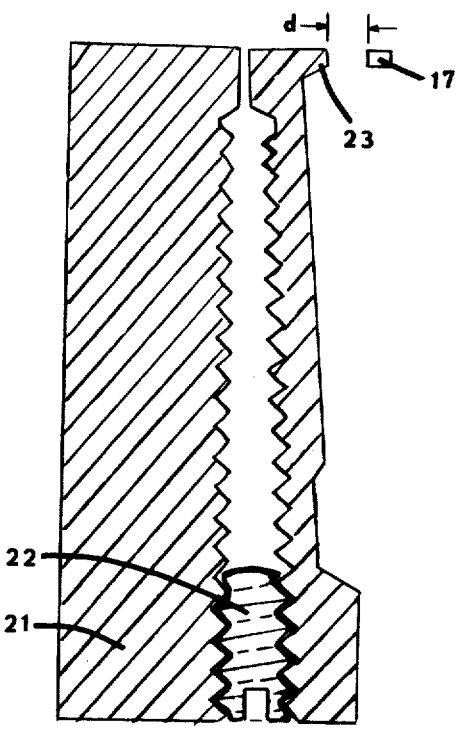
FIG. 4b is another assembly at minimum capacitance setting.

Adjustability of said vernier capacitor stators is obtained as follows: Before slotting the metal bar 21, a vertical hole is drilled and tapped in the center of each tongue. Then, said bar is slotted both longitudinally and crosswise as shown in FIG. 1, and the resulting tongues are bent backwards to close up the slots, which—upon mounting—causes edges 23, 25 . . . 26, 27 to be significantly remote from armature-bar 17 and hence producing only small amounts of capacitance. Next, set-screws 22, 24, etc. are inserted into said tapped holes through openings in base-plate 2, and their positions are adjusted with a suitable tool: Where the set-screw remains in its lowest position, as in item 22, edge 23 remains remote from armature-bar 17, and the capacitance remains minimal. Set-screw 24, however, is shown moved upward, causing edge 25 to be forced forward by wedge-action in the compressed tapped hole, and close to armature-bar 17 for maximum capacitance. Any intermediate set-screw position is obtainable, with a resulting very fine micrometer action. Edge 26 is shown fully retracted and with minimum capacitance, and edge 27 fully forward and with maximum resulting capacitance. The same applies for the remaining capacitor stators. FIG. 4a depicts a cross-section of a stator at maximum capacitance setting, and FIG. 4b another at minimum capacitance setting, illustrating the wedge micrometer action.

The capacitance values obtained in the vernier capacitors are governed by the equation $$C = F/3.6\pi \times d \text{ (pF)}$$
where $F$ = surface area (cm$^2$)
and $d$ = electrode spacing (cm).

Assuming an electrode area of 0.16 in. (0.4 cm) long and 0.02 in. (0.05 cm) wide, with a minimum spacing of 0.002 in. (0.005 cm), the maximum vernier capacitance is $C = 0.4 \times 0.05/11.3 \times 0.005 = 0.02/\mathbf{0.0565} = 0.35$ pF. If the minimum capacitance is 0.05 pF, the capacitance variation a magnetic material, a permanent magnet 52 can be mounted on said variation.

Figure 2:
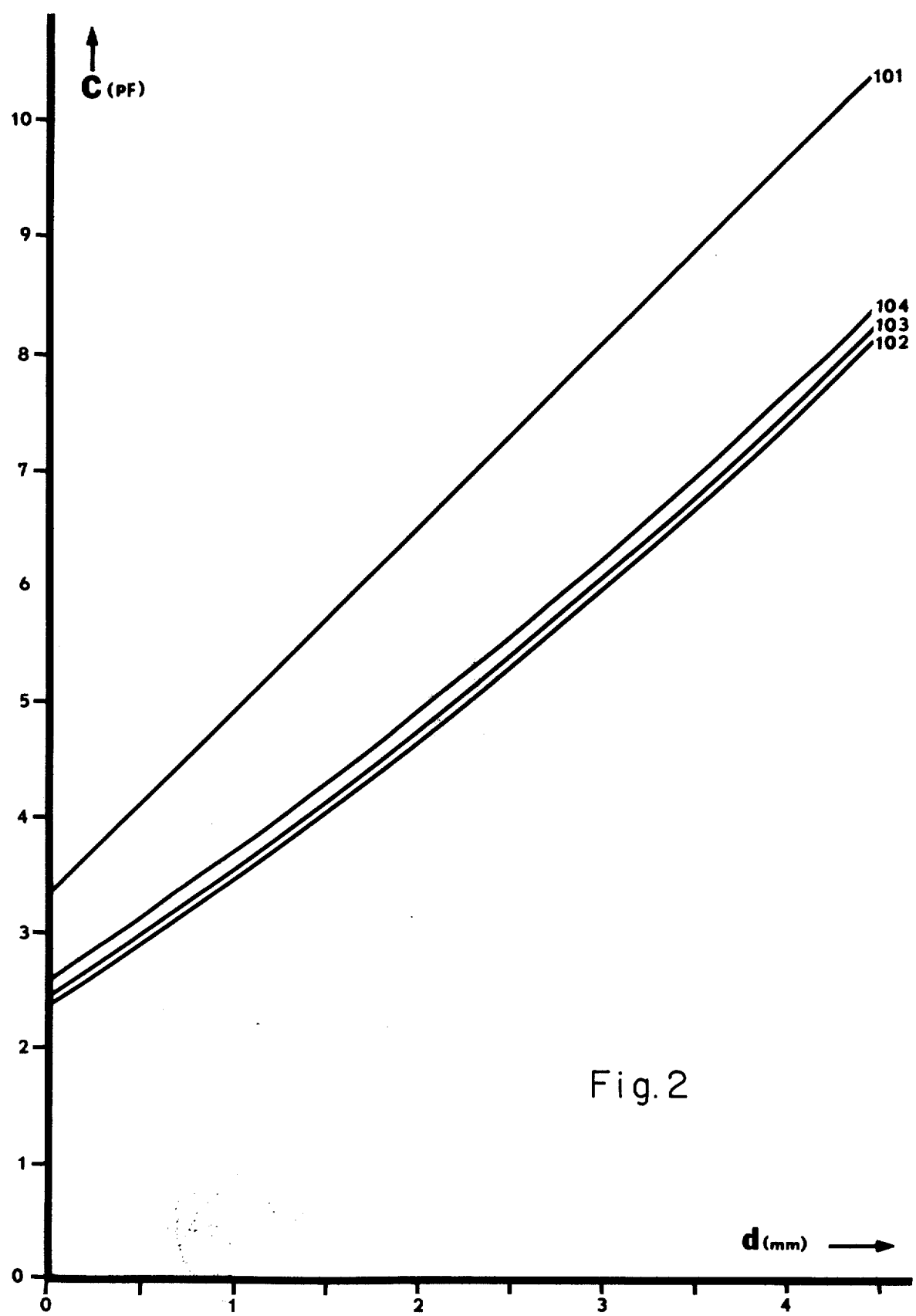
FIG. 2 is a graph of capacitance vs. displacement curves.

FIG. 2 shows typical capacitance vs. displacement curves:

Curve 101 depicts the approximately straight-line characteristics of an unmodified cylinder-and-piston capacitor.

Curve 102 is that of the same capacitor after shaping for a nonlinear capacitance vs. displacement characteristic.

Curve 103 is the same as 102, but with a plurality of vernier capacitors set to minimum capacitance.

Curve 104 is the same as 103, but with all vernier capacitors set to maximum. It is self evident that each vernier capacitor can be set to any intermediate value, independent of the other vernier capacitors, except for the overlapping effects between adjacent units.

Figure 3:
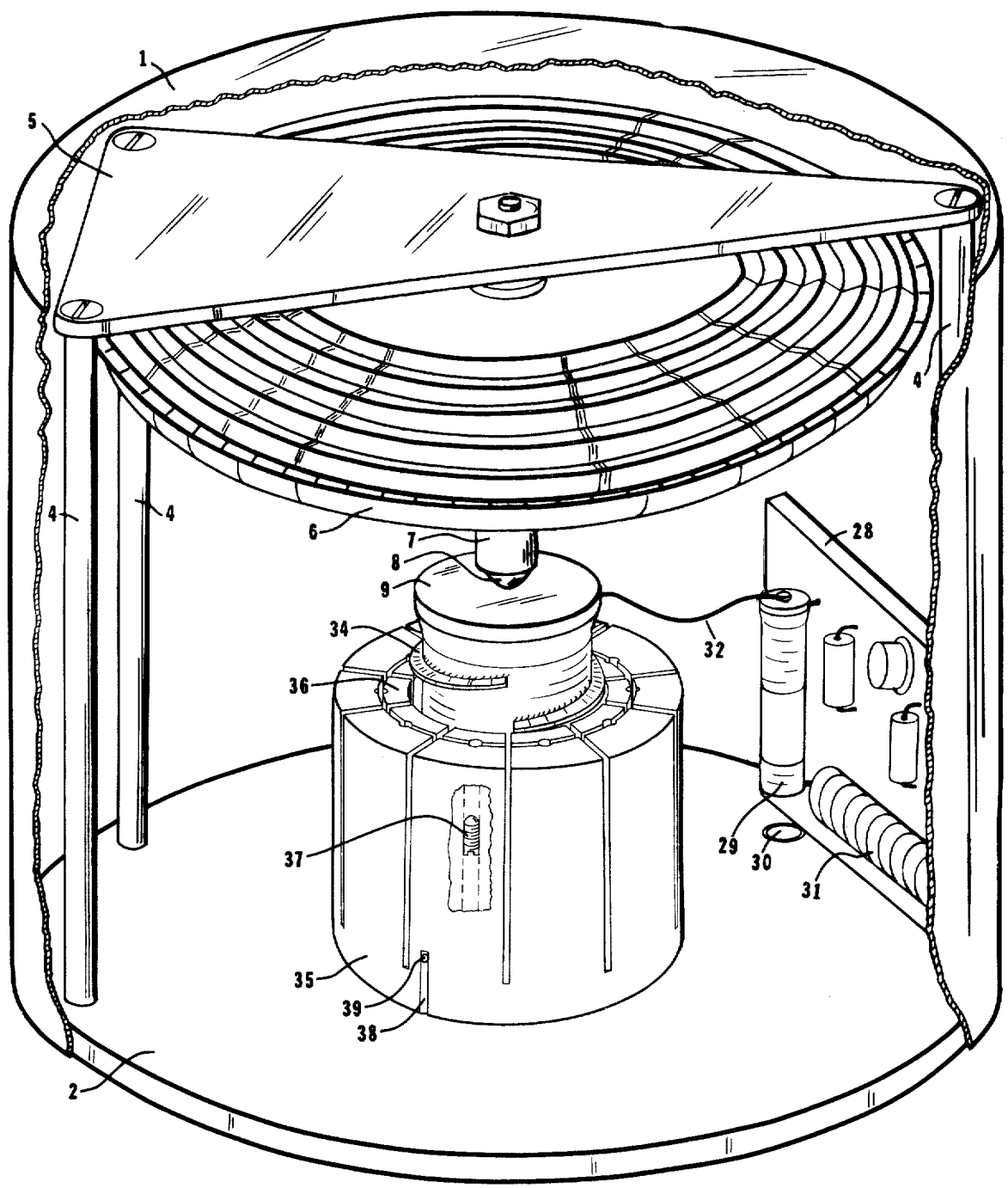
FIG. 3 is a schematic perspective view of a transducer with a circular arrangement of vernier capacitors.

FIG. 3 illustrates a capacitive transducer assembly similar to that of FIG. 1, but having a circular arrangement of vernier capacitors: Instead of the slanted armature-bar 17 of FIG. 1, the capacitor-cylinder 9 carries a circular metal-band 34 shaped as a slanted single-turn spiral whose end-spacing corresponds to the full-scale stroke of the transducer. Mounted concentrically around capacitor-cylinder 9, onto base-plate 2, is a cylindrical vernier-capacitor stator assembly 35 whose plurality of adjustable edges 35 surround said slanted-edge spiral. A plurality of setscrews 37 permit adjustment of stator-edge spacing analogous to the action of set-screws 22 and 24 in FIG. 1. A guide-pin 39 attached to the skirt of capacitor-cylinder 9, and gliding in a slot 38 machined into stator body 35 prevents said capacitor-cylinder from rotating. This anti-rotation guide on the circular vernier-capacitor assembly does not have to be as precise as that of the linear vernier-capacitor in FIG. 1, but fabrication of the circular vernier-capacitor assembly is more demanding.

Illustrated in schematical form both in FIG. 1 and FIG. 3 is an electronic component board to which capacitor-cylinder 9 is connected with a flexible conductor 32. Trimming capacitor 29 can be adjusted through an access-hole 30 in base-plate 2. In pressure transducer applications, a gas-tight threaded plug seals said access-hole.

Up to this point in the disclosure, a pressure capsule was chosen for illustration purposes as the mechanical input member. Among the many other possible embodiments, two purely mechanical displacement sensing transducer inputs are illustrated in FIGS. 5(a) and 5(b).

Figure 5A:
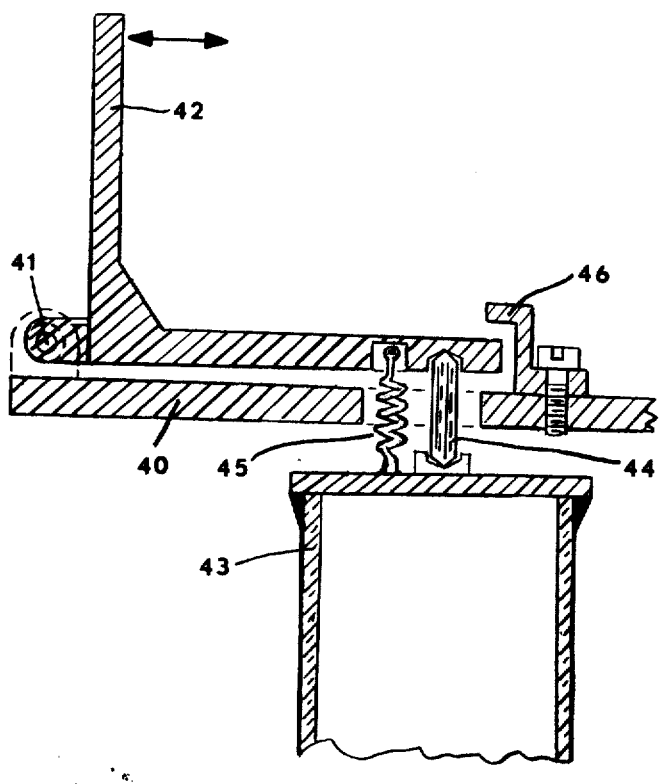
FIGS. 5a and 5b are partial modifications to FIGS. 1 and 3, for purely mechanical input members.

FIG. 5a shows a pivoting lever arrangement: A lever 42 is pivoted in two low-friction bearings 41 which are mounted on top support-plate 40. (A torsion-bar can be substituted for bearings 41 if spring-action is desired.) A connecting-rod 44 with pointed ends and rounded-off tips, fabricated from a hard, insulating material such as glass, ceramic, or fused quartz, rests with one end in a cone-shaped cavity of lever 42, and with the other in a cone-shaped cavity in the center of the end-plate on capacitor-cylinder 43. An extension-spring 45 connects said capacitor-cylinder 43 mechanically to said lever 42. If a metallic spring is used, at least one of its ends must be electrically insulated to avoid shorting of capacitor-cylinder 43. The use of an extension spring to couple the capacitor-cylinder to the mechanical input member imposes only very small loading on the input member, and in highly sensitive applications it can replace the compression spring 11 shown in FIG. 1. It is self evident, that extension spring 45 should be as soft as practical, and as close to connecting rod 44 as possible in order to minimize mechanical loading errors. A limit stop 46 serves to limit the transducer excursion.

Figure 5B:
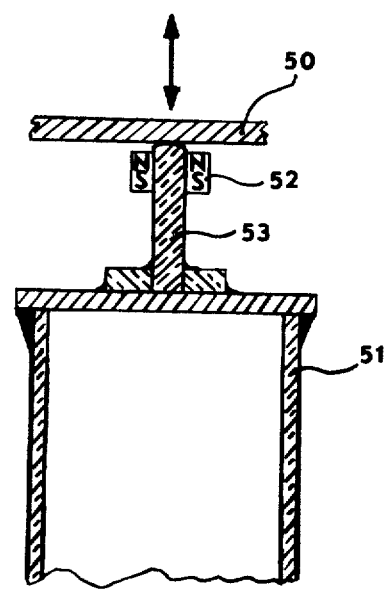

FIG. 5b shows a direct-acting push-pull arrangement: A hard, non-conducting push-rod 53 with polished, convex end is mounted in the center of the end-surface on capacitor-cylinder 51. A mechanical input member 50 with a polished bottom surface pushes said capacitor-cylinder downward. If said input member consists of a magnetic material, a permanent magnet 52 can be mounted on said push-rod 53; this will result in a push-pull action without the need for elastical springs.

If mechanical damping is required, for example on weighing scales, the dash-pot action inherent in more precise cylinder-and-piston capacitors can be used to good advantage. Where, on the other hand, more powerful dash-pot action is required, a commercially available glass dash-pot device can be made to serve also as a cylinder-aand-piston capacitor and be equipped with vernier trimmer capacitors according to this specification: Attachment of a metal foil electrode to the outer mantle of a typical ¾in. diameter glass dash-pot yields a capacitance variation in the order of 4 pF over a 0.5 inch stroke. This ends the discussion of the mechanical aspects of my invention.

Electrically, so far, the result is a capacitor assembly with a minimum capacitance in the order of 1 pF to 10 pF, and a capacitance variation in the order of 4 pF to 25 pF (depending on the cylinder diameter, wall thickness, type of dielectric, and the mechanical stroke), and with a wide range of curve shaping and calibration trimming capability.

Normally, the capacitor assembly iis connected to a metallic base plate acting as the common ground conductor, but if required it can be mounted electrically floating by use of insulating bushings and washers, or of a non-metallic base plate.

To convert the capacitance variation caused by the mechanical input displacement into a related electrical signal, two major methods exist:

1. Generation of an analog a.c. voltage proportional to the quantity being measured, by using the variable capacitor assembly as a variable reactance in a bridge or voltage divider circuit, with an excitation frequency in the region between 1 kHz and 1 MHz. This technique is well known, and is not further discussed in this disclosure.

2. Generation of a digital output signal proportional to the quantity being measured, by using the variable capacitor assembly to vary the frequency of a high-frequency oscillator, and converting the resulting frequency variation into digital signals with counters, by the following methods:

a. Usually, the variable capacitor is incorporated into an r.f. oscillator circuit, to vary its frequency. A quartz-crystal oscillator is divided down to generate a precise gate period, such as 0.1 sec. or 1.0 sec., and during this period cycles from the variable oscillator are counted. The use of a precise crystal oscillator would appear to be of considerable advantage, but the burden rests fully on the stability of the variable oscillator. Also, the generation of positive and negative digital outputs from a variable frequency oscillator requires rather complex and costly up-down counters, preset counters, or digital addition and subtraction.

b. Another method in common use employs a pair of similar r.f. oscillators whose output signals are mixed in a ring modulator or similar device, and the resulting difference frequency, after low-pass filtering, is counted as described in (a) above. Measuring the difference of two similar (and hence drift-tracking) oscillators greatly reduces the burden of stabilisation, but at the cost of a third precision oscillator, and the problem of generating bipolar digital outputs still remains to be solved.

c. My invention uses a third, novel system which breaks with the traditional laboratory frequency measurement techniques listed under (a) and (b) above, and is optimized for transducer applications where the objective is not measurement of the exact frequency as such, but the capacitance variation caused by the displacement to be determined. This is accomplished by the following means:

A. Two highly stable LC oscillators are fabricated according to the most advanced stabilisation techniques, and are isolated from each other in every way to avoid pulling effects. Oscillator A is fixed-tuned at, for example, 15 MHz, and oscillator B is similar, but is varied by the cylinder-piston-and-vernier capacitor assembly between 15 MHz and 14 MHz, or—for bidirectional output—between 15.5 MHz and 14.5 MHz. Because the two oscillators are similar, their drift errors tend to track and cancel out when the frequency difference between them is measured
    B. A self-gating technique which uses the fixed-frequency oscillator for two different tasks, and eliminates the requirement for a third oscillator.
    C. Two simple, identical binary up-counters with an even number of stages (for example, $2^{16}$ = 65,536 count) generate a gate period proportional to the quantity being measured.
    D. A third counter, which during said gate period counts cycles from the fixed-frequency oscillator, can generate binary, BCD, Gray, or other digital codes as required by the receiving digital system.
    E. A digital priority detection circuit for sensing which of the two binary counters filled up first, which generates a NEGATIVE INPUT signal when applicable.

Figure 6:
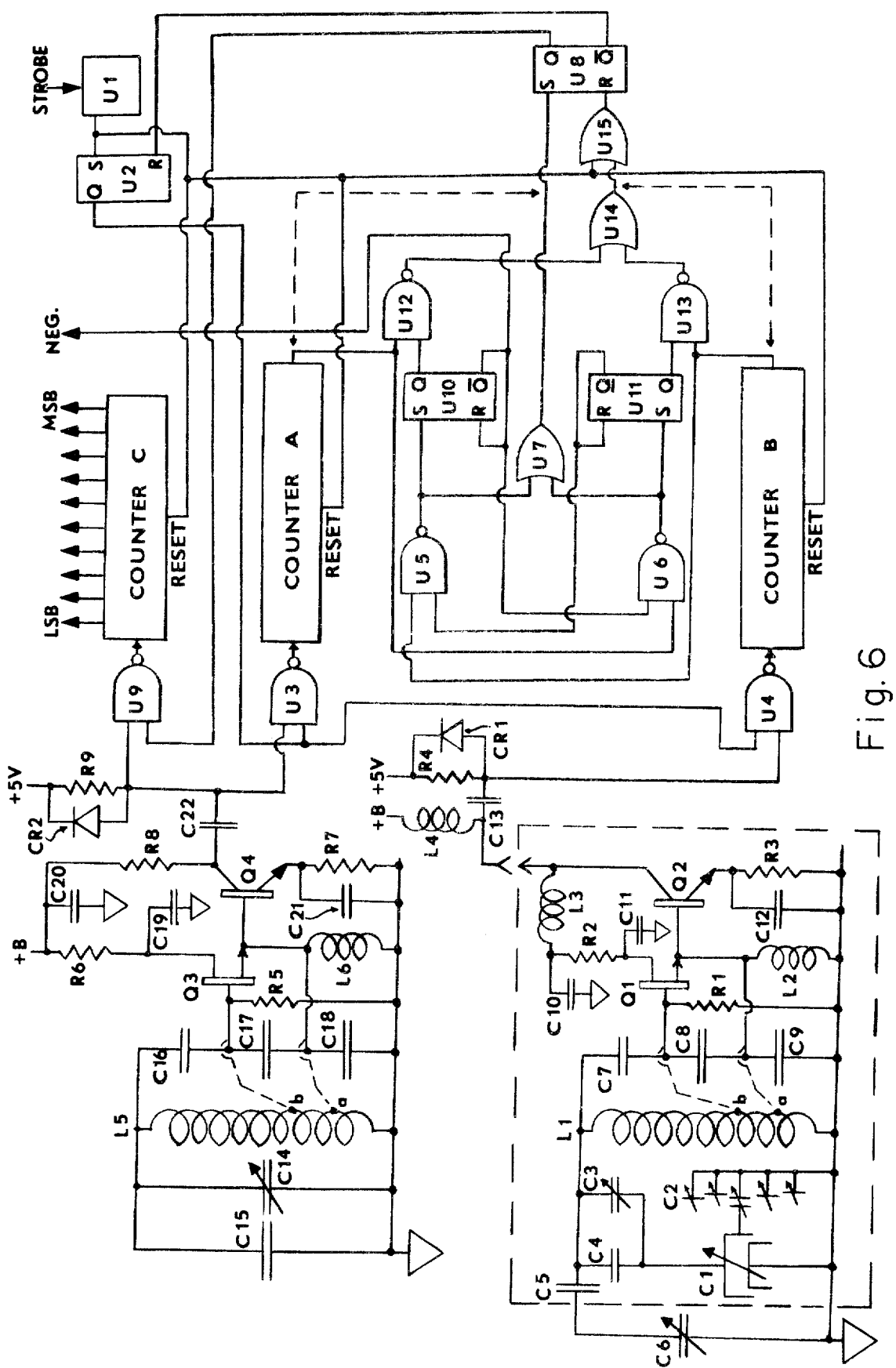
FIG. 6 is a schematic circuit diagram of a capacitive transducer with parallel digital output.

The schematic circuit diagram in FIG. 6 is representative of one of various possible implementations of my invention. The left-hand portion of FIG. 6, containing two high-frequency oscillators, is discussed first.

Mechanically, it is possible to package all the circuits in a common enclosure, but the extreme mechanical rigidity required of the transducer input members, and the need to decouple the two oscillators recommends separation into two compartments, particularly in pressure transducer applications. With this premise, FIG. 6 shows the input members and associated variable-frequency oscillator in a dashed rectangle in the lower-left portion; C1 is the cylinder-and-piston capacitor varied by the mechanical input member, and C2 symbolizes the vernier-capacitor assembly. Capacitors C3 through C9 combine to set the center frequency, which in this example is approximately 15 MHz. Capacitor C6 is mounted externally, and serves to zero-set the transducer output, or to introduce predetermined offsets, such as barometric correction in altimeters. C5 is a padding capacitor in series with C6, and three to ten times smaller in capacitance than C6, thus reducing the effect of stray capacitance variations. As an alternative, C6 could be placed in parallel with R1, or onto a tap of L1.

Inductors L1 and L5 are identical, ultrastable types, with their conductive turns fused to cylindrical bodies of glass, fused quartz, or ceramic, and with no iron, copper or brass slugs to affect stability. While ordinary coil windings have relatively large positive temperature coefficients of inductance because of expansion of the copper turns, fusing the turns to an insulator of much lower expansion coefficient greatly reduces this expansion. An inductance value of 2.0 microhenry was chosen in this example which resonates at 15 MHz with 56.3 pF total circuit capacitance.

The driving device Q1 can be any active device with high power gain and low capacitance. A junction field-effect transistor with a $G_m$ of 5,000 $\mu$mho or greater would permit placement of the driving taps on the resonant circuit in the bottom quarter, and reduce loading effects to negligible values. The taps for the gate and source terminals of the field-effect transistor can be obtained in a capacitive divider C7 – C8 – C9 (with capacitance values in the order of 30 pF – 300 pF – 300 pF), or in an inductive autotransformer (taps $a$ and $b$ on inductor L1, and dashed-line connections).

Padding capacitors C4 and C3 are chosen to provide a 10 % adjustment range of the frequency span. In highly reproducible designs, they could be made fixed, or eliminated altogether, in which case C1 would be connected directly to the top of L1.

The top frequency of the oscillator is set on the piston of C1 (Item 14 in FIG. 1) at the start of calibration, then the input displacement increased in 10 % steps (assuming 9 vernier capacitors) and the latter adjusted progressively.

The remaining oscillator components are conventional. R1 establishes the d.c. bias for Q1 and is usually between 10 k and 100 kohms. L2, L3, and L4 serve as d.c. low pass, with values in the order of 10 to 100 microhenrys, in conjunction with C10 through C13 which can be common bypass ceramic types in the order of 0.01 microfarad.

Q2 serves as isolation and booster amplifier, and can be a bipolar transistor, or another FET. C10/L3 and C13/L4 form a high-pass and low-pass network which permits use of a single contact connector for bringing d.c. power into the transducer capsule, and conducting the r.f. signal out, which may be desirable in modular or remotely located pressure transducer applications. (If a second conductor is not objectionable, L3 and L4 can be replaced with conventional RC coupling).

The r.f. amplitude from Q2 (and Q4) should be in the order of 10 Volts peak-to-peak; diode CR1 (and CR2) and the clamping diode at the input of TTL gates U3, U4, and U9 will square this signal off. Depending on the frequencies and amplitudes used, use of Schmitt-triggers may be advantageous instead of conventional gates, such as the SN-7413 Dual Schmitt Trigger.

The second oscillator Q3/Q4 is identical with said variable frequency oscillator Q1/Q2, except for the fixed frequency operation and the absence of the single-conductor coupling network. This will, in most cases, produce excellent tracking over a wide range of ambient temperatures and supply voltages. Residual divergence which may also be caused by residual expansion errors in the transducer members can be compensated by corresponding proportions of capacitors with negative and positive temperature coefficients (mica and polystyrene, or ceramics with various T.C.s).

The logic circuits of the transducer operate as follows:

a. Variable frequency Oscillator Q1/Q2 is free-running continuously into Gate U4, and Fixed Frequency Oscillator Q3/Q4 is free-running continuously into Gates U3 and U9.

b. Astable Multivibrator U1 is free-running continuously, with a holding-and-display period in the order of 1 second, and a RESET pulse of 0.1 microsecond. A strobe input line permits remote synchronisation with an external digital system.

c. When the RESET pulse appears at the output of U1, it sets U2 and resets Counters A, B, and C, and Flip-Flop U8 through U15.

d. At this instant, U2 toggles and opens Gate U3, enabling Counter A to start counting cycles from Fixed Frequency Oscillator Q3/Q4; simultaneously, U4 is gated on and Counter B starts counting cycles from Variable Frequency Oscillator Q1/Q2. Counters A and B are identical with—for example—16 stages of binary division, hence after 65,536 input cycles they fill up and their most-significant-bit output terminals toggle from logic 0 to logic 1.

e. Assuming that Fixed Oscillator Q3/Q4 frequency is higher than that of said Variable Frequency Oscillator, Counter A will fill up first and toggle to logic 1. This activates Gates U6 and U7, and in turn sets Flip-Flop U8 whose output toggles to logic 1 and opens Gate U9, causing Counter C to start counting cycles fro Fixed Frequency Oscillator Q3/Q4. (Counter C can be configured to count in any code desired at the transducer output, such as binary, BCD, Gray code, or a combination of these).

f. Then, when Counter B also fills up, it activates Gate U13, U14, and U15, which in turn resets Flip-Flop U8 and closes Gate U9, thus stopping Counter C which now stores a digital count proportional to the frequency difference of two oscillators.

g. If the frequency of Fixed Frequency Oscillator Q3/Q4 is always higher than that of Variable Frequency Oscillator Q1/Q2, the output of Counter A can be connected directly (as shown by dashed line) to the S-terminal of U8, and the output of Counter B can be connected directly (dashed line) to the input of U15, and U5, U6, U7, U10 through U14 could be eliminated.

h. Bidirectional operation is as follows: On the premise that Counter A has filled up first, its output pulls up the lower input terminal of Gate U6 and—assuming that the other input of U6 is already high—the output of U6 goes low, which in turn causes the output of OR-Gate U7 to go low, and to set Flip-Flop U8 which opens Gate U9 and starts Counter C counting. At the same instant, U6 sets Flip-Flop U11 which signifies that Counter A filled up first. Then, as Counter B fills up also, its output pulls up the upper input terminal of U5, but the other input of U5 has already been pulled down by the $\overline{Q}$ output of Flip-Flop U11, hence blocking U5 and U10. The output of Counter B does, however, upon going high, activate OR-Gate U14, which in turn activates OR-Gate U15 and resets Flip-Flop U8, hence closing Gate U9 and stopping Counter C.

If, on the other hand, Counter B should fill up first (when the input displacement is negative, and Variable Frequency Oscillator Q1/Q2 faster), the lock-out circuits U5/U6, U10/U11, and U12/U13 switch places. In either case, U5 and U6 prevent the late filling counter from setting U8, and U12 and U13 prevent the early filling counter from resetting U8.

The $\overline{Q}$ output of U10 also activates the NEG. Input signal which indicates the polarity of the digital transducer output.

The transducer resolution is the reciprocal of the Counter A and B counts, multiplied by the ratio of frequency and frequency-span; in the selected example $r = 15$ MHz/1 MHz·65,536 = 1/4369 = 0.023 %.

The logic circuits are conveniently implemented with 7400 series TTL circuits, or 5400 series for extreme temperatures. Gates U3, U4, U5, U6, U9, U12, U13 can be one-fourth of a 7400 Quad NAND-gate, except that U3, U4, and U9 might be one-half of a 7413 Schmitt-Trigger, for sharper squaring of the oscillator outputs. U7, U14, and U15 can be one-fourth of a 7408 Quad OR-Gate, while U2, U8, U10, and U11 can be one-half of a 7474 or 7473 Dual Flip-Flop. Counters A and B can each be four 4-stage binary counters 7493, and Counter C can be made up of 7493, 7490, or other counters required to produce the specified code, except that higher speed flip-flops should serve as input stages.

I claim:

1. In a capacitive transducer for converting a small mechanical displacement into a corresponding electrical signal, the improvement comprising:

a. a displaced mechanical input member representing the quantity being measured;

b. a variable capacitor comprising a metallic cylinder, free to move axially and concentrically but insulated from a stationary piston; the surfaces of said cylinder and said piston being shaped to yield a predetermined nonlinear capacitance to displacement relationship;

c. a means for connecting said mechanical input member axially to said capacitor-cylinder without requiring exact centering, comprising a flat surface perpendicular to said axis on one of said members, and a convex surface on the other member;

d. an elastic member causing said capacitor-cylinder to press lightly against said mechanical input member;

e. a plurality of magnetic members exerting forces upon each other which causes said capacitor-cylinder to remain in mechanical contact with said mechanical input member;

f. a guide restraining said capacitor-cylinder rotationally;

g. a plurality of stationary, individually adjustable vernier capacitor stators with edges facing an axially slanted metallic edge which is attached to the outer surface of said capacitor-cylinder, thereby forming a plurality of adjustable vernier-capacitors staggered along said displacement-path for trimming the transducer calibration curve in a plurality of locations;

h. a threaded member for adjustment of the insertion depth of said stationary capacitor-piston into said capacitor-cylinder;

i. a plurality of support members controlling the spacing between said mechanical input member and said capacitor-piston, having coefficients of thermal expansion chosen to compensate thermal expansion errors caused by other components.

2. In a capacitive transducer for converting a small mechanical displacement into a corresponding electrical signal, the improvement comprising:

a. a variable capacitor assembly according to claim 1;

b. a padding capacitor connected in series with the insulated terminal of said variable capacitor assembly, and limiting the effective capacitance variation of said variable capacitor assembly;

c. an inductance coil having a plurality of metallic turns fused to an insulating form and being connected in parallel to the series connected said variable capacitor and said padding capacitor;

d. a plurality of additional capacitors connected across said inductance coil, having capacitance values chosen to determine the range of resonance frequencies of said capacitor and inductor combination, and having temperature coefficients of capacitance chosen to minimize shifts of said resonance frequencies caused by temperature variations;

e. an electronic amplifying device for exciting said resonant circuit into continuous oscillation, and connected across no more than one quarter of said resonant circuit reactance to minimize frequency pulling;

f. an externally adjustable variable capacitor connected across said resonant circuit for introduction of predetermined frequency offsets;

h. a single-conductor circuit for both carrying the direct-current supply voltage into said transducer, and exiting said high-frequency oscillator signal, comprising low-pass filters for the direct-current path, and high-pass filters for said said high-frequency signal.

3. In a capacitive transducer for converting a small mechanical displacement into a corresponding electrical signal, the improvement comprising:

a. a variable high-frequency oscillator according to claim 2;

b. a fixed high-frequency oscillator similar to said variable high-frequency oscillator, except that a fixed capacitor is used instead of said variable capacitor assembly of claim 1;

c. a digital frequency counter A, starting upon a strobe signal to count cycles from said fixed-frequency oscillator until a filled-up signal appears at its most-significant bit output terminal;

d. a digital frequency counter B, indentical to said digital frequency counter A, and simultaneously upon said strobe signal starting to count cycles from said variable-frequency oscillator until a filled-up signal appears at its most-significant-bit output terminal;

e. a third digital frequency counter C which starts counting cycles from said fixed-frequency oscillator when the first of said two binary counters is filled up, and which stops counting when the other binary counter is filled up, thus storing a digital count proportional to the frequency difference between said fixed and variable high-frequency oscillators, and substantially immune to disturbances equally affecting both high-frequency oscillators;

f. a bistable latching circuit, sensing which of said binary counters A and B was the first to fill up, and generating a negative-input signal whenever said binary counter B was first filled-up.

* * * * *